US011223458B2

(12) United States Patent
Liu

(10) Patent No.: US 11,223,458 B2
(45) Date of Patent: Jan. 11, 2022

(54) METHOD AND APPARATUS FOR PROCESSING PHYSICAL BROADCAST CHANNEL (PBCH) BANDWIDTH, AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 105 days.

(21) Appl. No.: 16/833,389

(22) Filed: Mar. 27, 2020

(65) Prior Publication Data
US 2020/0228276 A1 Jul. 16, 2020

Related U.S. Application Data

(63) Continuation of application No. PCT/CN2017/106858, filed on Oct. 19, 2017.

(51) Int. Cl.
*H04L 5/00* (2006.01)
*H04W 28/06* (2009.01)
*H04W 72/04* (2009.01)

(52) U.S. Cl.
CPC ........... *H04L 5/0048* (2013.01); *H04W 28/06* (2013.01); *H04W 72/0453* (2013.01); *H04W 72/0493* (2013.01)

(58) Field of Classification Search
CPC ..... H04L 5/0048; H04L 5/001; H04L 5/0051; H04L 5/0094; H04L 5/0053;
(Continued)

(56) References Cited

U.S. PATENT DOCUMENTS

| 2014/0247781 A1 | 9/2014 | Somasundaram et al. |
| 2016/0029354 A1* | 1/2016 | Lyu .................. H04B 1/69 370/329 |
| 2018/0131491 A1 | 5/2018 | Xiong et al. |

(Continued)

FOREIGN PATENT DOCUMENTS

| CN | 105027584 A | 11/2015 |
| CN | 106455040 A | 2/2017 |
| CN | 106507439 A | 3/2017 |

(Continued)

OTHER PUBLICATIONS

3GPP TSG-RAN WG1 NR#90 R1-1713376, Aug. 21-25, 2017, Prague, Czech Republic, Agenda item: 6.1.1.2.3, Source: Qualcomm Incorporated, Title: Remaining system information delivery consideration, Document for: Discussion/Decision.
Notice of Allowance of the Chinese application No. 201780001619. 6, dated Jun. 1, 2021.

(Continued)

*Primary Examiner* — Thai Nguyen
(74) *Attorney, Agent, or Firm* — Syncoda LLC; Feng Ma

(57) ABSTRACT

A PBCH bandwidth processing method includes: determining whether a current frequency band is a preset type of frequency band, the preset type of frequency band being capable of using two subcarrier spacings (SCSs); if the current frequency band is the preset type of frequency band, reducing the number of PBCH information bits comprised in a load in a PBCH corresponding to the current frequency band and maintaining the number of resource elements (REs) occupied by a demodulation reference signal (DMRS) in a synchronization signal block (SSB) corresponding to the current frequency to be unchanged, or maintaining the number of PBCH information bits comprised in the load in the PBCH corresponding to the current frequency band to be unchanged and reducing the number of REs occupied by the (Continued)

DMRS in the SSB corresponding to the current frequency band.

17 Claims, 7 Drawing Sheets

(58) Field of Classification Search
CPC ............... H04L 5/0058; H04W 28/06; H04W 72/0453; H04W 72/0493; H04W 72/1205; H04W 72/1278
See application file for complete search history.

(56) References Cited

U.S. PATENT DOCUMENTS

| | | | |
|---|---|---|---|
| 2018/0248642 A1* | 8/2018 | Si | ............... H04L 5/0092 |
| 2020/0221403 A1* | 7/2020 | Gao | ............... H04W 72/005 |

FOREIGN PATENT DOCUMENTS

| | | |
|---|---|---|
| EP | 3316511 A1 | 5/2018 |
| WO | 2014098401 A1 | 6/2014 |
| WO | 2017019120 A1 | 2/2017 |

OTHER PUBLICATIONS

Nokia Alcatel-Lucent Shanghai Bell. NR-PBCH Content. 3GPP TSG RAN WG1 NR Ad-Hoc#2 R1-1711264 Jun. 30, 2017 (Jun. 30, 2017), entire document.
International Search Report in the international application No. PCT/CN2017/106858, dated Jun. 29, 2018.
English translation of the Written Opinion of the International Search Authority in the international application No. PCT/CN2017/106858, dated Jun. 29, 2018.
3GPP TR 38.811V0.1.0 (Jun. 2017); 3rd Generation Partnership Project;Technical Specification Group Radio Access Network; Study on New Radio (NR) to support Non Terrestrial Networks (Release 15).
First Office Action of the Chinese application No. 201780001619.6, dated Sep. 30, 2020.
3GPP TSG RAN WG1 Meeting 90bis, R1-1718180, NTT Docomo, Inc, "Discussion on remaining details on NR-PBCH and PBCH-DMRS", mailed on Oct. 13, 2017.
3GPP TSG RAN WG1#90b, R1-1717576, Samsung, "Remaining details on synchronization signal", mailed on Oct. 13, 2017.

\* cited by examiner

METHOD AND APPARATUS FOR PROCESSING PHYSICAL BROADCAST CHANNEL (PBCH) BANDWIDTH, AND BASE STATION

CROSS-REFERENCE TO RELATED APPLICATION

The present application is a continuation of International Application No. PCT/CN2017/106858 filed on Oct. 19, 2017, the disclosure of which is hereby incorporated by reference in its entirety.

BACKGROUND

It was put forward in a recent discussion on a 3rd generation partnership project (3GPP) that some frequency bands need to use two types of subcarrier spacings (SCSs).

SUMMARY

The present disclosure generally relates to the communication technology field, and more specifically to a method and device for processing a physical broadcast channel (PBCH) bandwidth, a base station and a computer readable storage medium.

According to a first aspect of the embodiment of the disclosure, a method for processing a PBCH bandwidth is provided, which includes the following operations:

it is determined whether a current frequency band is a frequency band of a preset type, the frequency band of the preset type being capable of using two types of subcarrier spacings (SCSs);

in response to that the current frequency band is the frequency band of the preset type, a number of bits of PBCH information included in a payload of a PBCH corresponding to the current frequency band is reduced and a number of resource elements (REs) occupied by a demodulation reference signal (DMRS) in a synchronization signal block (SSB) corresponding to the current frequency is kept unchanged, or, the number of bits of the PBCH information included in the payload of the PBCH corresponding to the current frequency band is kept unchanged and the number of the REs occupied by the DMRS in the SSB corresponding to the current frequency band is reduced.

In some embodiments of the present disclosure, the operation of reducing the number of bits of PBCH information included in the payload of the PBCH corresponding to the current frequency band includes:

the PBCH information in the payload is reduced by 14-22 bits.

In some embodiments of the present disclosure, the operation of reducing the PBCH information in the payload by 14-22 bits includes:

the PBCH information in the payload is reduced by 18 bits.

In some embodiments of the present disclosure, the operation of reducing the number of the REs occupied by the DMRS in the SSB corresponding to the current frequency band includes:

the DMRS in the SSB corresponding to the current frequency band is reduced by 24-48 REs.

In some embodiments of the present disclosure, the operation of reducing the DMRS in the SSB corresponding to the current frequency band by 24-48 REs includes:

the DMRS in the SSB corresponding to the current frequency band is reduced by 36 REs.

In some embodiments of the present disclosure, the method further includes:

in response to that the current frequency band is not the frequency band of the preset type, a bandwidth of the PBCH is kept unchanged by reducing the number of bits of PBCH information included in the payload of the PBCH corresponding to the current frequency band and increasing the number of REs occupied by the DMRS in the SSB corresponding to the current frequency band.

According to a second aspect of the embodiment of the disclosure, a device for processing a PBCH bandwidth is provided, which includes the following portions:

a determining portion, configured to determine whether a current frequency band is a frequency band of a preset type, wherein the frequency band of the preset type is capable of using two types of SCSs; and a first processing portion, configured to: if the determining portion determines that the current frequency band is the frequency band of the preset type, reduce a number of bits of PBCH information included in a payload of a PBCH corresponding to the current frequency band and keep a number of REs occupied by a DMRS in a SSB corresponding to the current frequency unchanged, or, keep the number of bits of the PBCH information included in the payload of the PBCH corresponding to the current frequency band unchanged and reduce the number of the REs occupied by the DMRS in the SSB corresponding to the current frequency band.

In some embodiments of the present disclosure, the first processing portion includes the following sub-portion:

a first reducing sub-portion, configured to reduce the PBCH information in the payload by 14-22 bits.

In some embodiments of the present disclosure, the first reducing sub-portion is configured to:

reduce the PBCH information in the payload by 18 bits.

In some embodiments of the present disclosure, the first processing portion includes the following sub-portion:

a second reducing sub-portion, configured to reduce the DMRS in the SSB corresponding to the current frequency band by 24-48 REs.

In some embodiments of the present disclosure, the second reducing sub-portion is configured to:

reduce the DMRS in the SSB corresponding to the current frequency band by 36 REs.

In some embodiments of the present disclosure, the device further includes the following portion:

a second processing portion, configured to keep, if the determining portion determines that the current frequency band is not the frequency band of the preset type, a bandwidth of the PBCH unchanged by reducing the number of bits of PBCH information included in the payload of the PBCH corresponding to the current frequency band and increasing the number of REs occupied by the DMRS in the SSB corresponding to the current frequency band.

According to a third aspect of the embodiment of the disclosure, a base station is provided, which includes:

a processor;

a memory configured to store instructions executable by the processor;

wherein the processor is configured to:

determine whether a current frequency band is a frequency band of a preset type, the frequency band of the preset type being capable of using two types of SCSs; and in response to that the current frequency band is the frequency band of the preset type, reduce a number of bits of PBCH information included in a payload of a PBCH corresponding to the current frequency band and keep a number of REs occupied by DMRS in a SSB corresponding to the current frequency unchanged, or, keep the number of bits of the PBCH information included in the payload of the PBCH corresponding to the current frequency band unchanged and reduce the number of the REs occupied by the DMRS in the SSB corresponding to the current frequency band.

According to a fourth aspect of the embodiment of the disclosure, a computer readable storage medium is provided. The computer readable storage medium stores computer instructions that, when executed by a processor, cause the processor to implement operations of the above method for processing the PBCH bandwidth.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
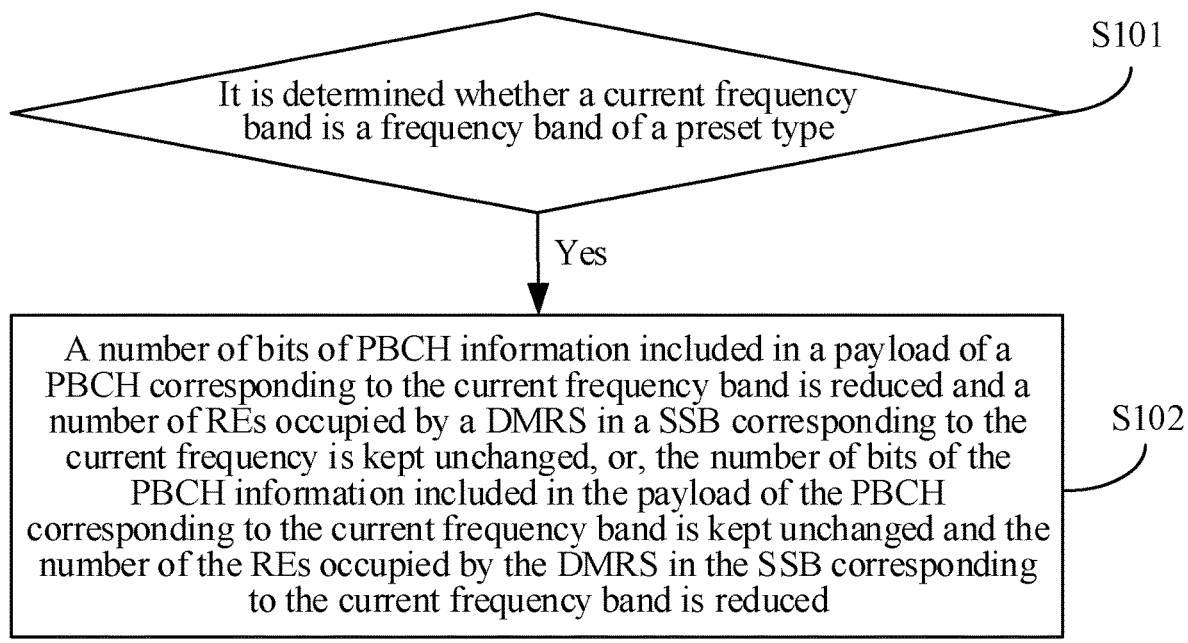
FIG. 1 is a flowchart illustrating a method for processing a PBCH bandwidth according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

As for a larger SCS on these frequency bands, a synchronization grid for an initial search for a synchronization signal will become very small for, and due to the case that these frequency band may be very narrow, the number of attempts to detect the synchronization signal will be large after a minimum bandwidth of user equipment (UE) is determined. In some extreme situations, the time the UE spends in searching for the synchronization signal will be up to 15 minutes, which is unacceptable to the UE.

Various embodiments of the disclosure provide a method and device for processing a PBCH bandwidth, a base station and a computer readable storage medium, to resolve a problem of an excessive time for searching for a synchronization signal by the UE, which is caused by some frequency bands.

FIG. 1 is a flowchart illustrating a method for processing a PBCH bandwidth according to some embodiments of the present disclosure of the disclosure, which is described from a base station side. As illustrated in FIG. 1, the method for processing the PBCH bandwidth includes the following operations.

In S101, it is determined whether a current frequency band is a frequency band of a preset type, the frequency band of the preset type being capable of using two types of SCSs.

In a 5G system, some frequency bands are capable of using one SCS while some other frequency bands are capable of using two SCSs. In the embodiment of the disclosure, the frequency band, which uses two SCSs, is called the frequency band of the preset type. Due to the case that the frequency band of the preset type is capable of using two SCSs, there may be a problem of an excessive time for searching for a synchronization signal by the UE.

In S102, in response to that the current frequency band is the frequency band of the preset type, a number of bits of PBCH information included in a payload of a PBCH corresponding to the current frequency band is reduced and a number of REs occupied by a DMRS in a SSB corresponding to the current frequency is kept unchanged, or the number of bits of the PBCH information included in the payload of the PBCH corresponding to the current frequency band is kept unchanged and the number of the REs occupied by the DMRS in the SSB corresponding to the current frequency band is reduced.

In the embodiment of the disclosure, the symbols occupied by the PBCH in the SSB occupies 288 REs, one third of which are DMRSs and the remaining two thirds of which are payloads of the PBCH. The payload includes the PBCH information and a cyclic redundancy check (CRC).

When the current frequency band is the frequency band of the preset type, the PBCH bandwidth may be reduced by reducing the number of bits of the PBCH information included in the payload of the PBCH corresponding to the current frequency band and keeping the number of the REs occupied by the DMRS in the SSB corresponding to the current frequency unchanged. For example, the PBCH information in the payload may be reduced by 14-22 bits. Preferably, the PBCH information in the payload may be reduced by 18 bits. The PBCH bandwidth may also be reduced by keeping the number of bits of the PBCH information included in the payload of the PBCH corresponding to the current frequency band unchanged and reducing the number of the REs occupied by the DMRS in the SSB corresponding to the current frequency band. For example, the DMRS in the SSB corresponding to the current frequency band may be reduced by 24-48 REs. Preferably, the DMRS in the SSB corresponding to the current frequency band may be reduced by 36 REs.

It is to be noted that the PBCH information of 12 bits is equivalent to the PBCH information of 1 physical resource block (PRB), and thus reducing of the number of bits of the PBCH information included in the payload of the PBCH corresponding to the current frequency band may be replaced by reducing of the number of PRBs of the PBCH information included in the payload of the PBCH corresponding to the current frequency band. Similarly, in terms of DMRS, 6 REs are equivalent to 1 PRB, and thus reducing of the number of the REs occupied by the DMRS in the SSB corresponding to the current frequency band may be replaced by reducing of the number of PRBs of the DMRS in the SSB corresponding to the current frequency and. In other words, all alternatives which are modified according to unit conversions shall be within the protection scope of the embodiment of the disclosure.

In the above embodiment of the disclosure, when the current frequency band is the frequency band of the preset type, the PBCH bandwidth can be reduced by means of reducing the number of bits of the PBCH information included in a payload of the PBCH corresponding to the current frequency band and keeping the number of the REs occupied by the DMRS in the SSB corresponding to the current frequency unchanged, or keeping the number of bits of the PBCH information included in the payload of the PBCH corresponding to the current frequency band unchanged and reducing the number of the REs occupied by the DMRS in the SSB corresponding to the current frequency band, so as to solve the problem that an excessive time is spent by UE in searching for a synchronization signal.

Figure 2:
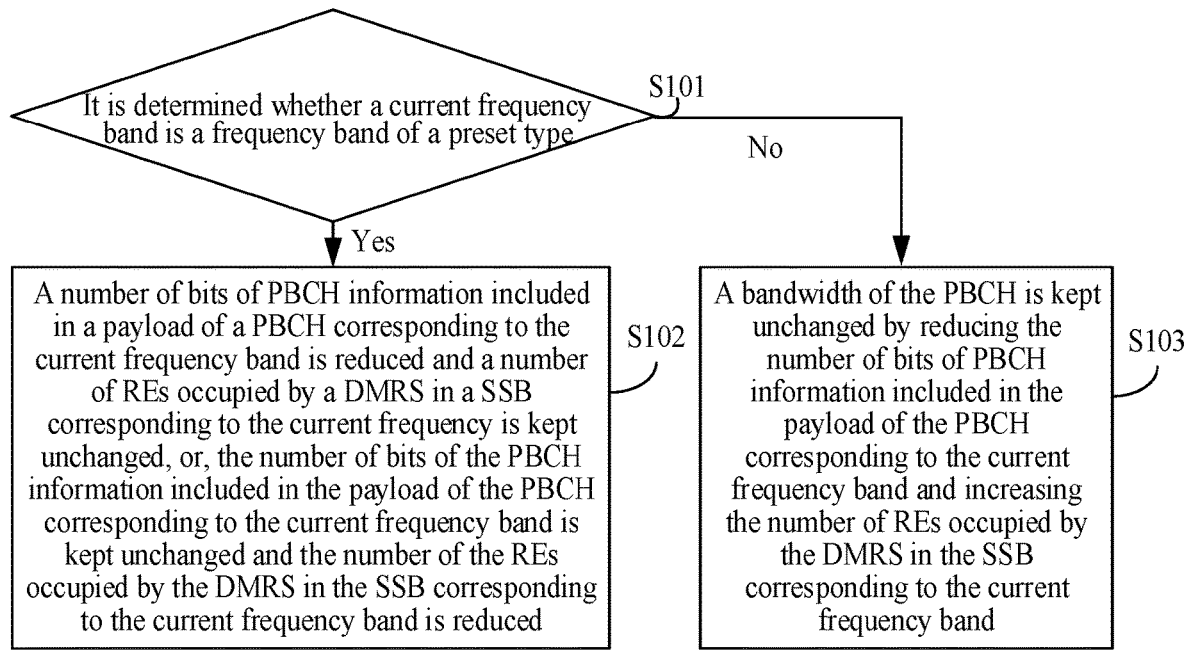
FIG. 2 is a flowchart illustrating another method for processing a PBCH bandwidth according to some embodiments of the present disclosure.

FIG. 2 is a flowchart illustrating another method for processing a PBCH bandwidth according to some embodiments of the present disclosure of the disclosure. As illustrated in FIG. 2, after the operation in S101 is executed, the method for processing the PBCH bandwidth may further includes the following operation.

In S103, in response to that the current frequency band is not a frequency band of a preset type, a bandwidth of the PBCH is kept unchanged by reducing a number of bits of PBCH information included in a payload of a PBCH corresponding to the current frequency band and increasing the number of REs occupied by a DMRS in a SSB corresponding to the current frequency band.

When the current frequency band is not the frequency band of the preset type, there is no problem of an excessive time for searching for a synchronization signal by the UE. In the embodiment of the disclosure, in order to reduce an impact on the whole PBCH coverage in a 5G system, the number of bits of PBCH information included in the payload of the PBCH corresponding to the current frequency band can be reduced while increasing the number of REs occupied by the DMRS in the SSB corresponding to the current frequency band, so as to keep the bandwidth of the PBCH unchanged.

In the above embodiments of the disclosure, when the current frequency band is not the frequency band of the preset type, the bandwidth of the PBCH is kept unchanged by means of reducing the number of bits of PBCH information included in the payload of the PBCH corresponding to the current frequency band and increasing the number of REs occupied by the DMRS in the SSB corresponding to the current frequency band, so as to solve the problem of an excessive time for searching for a synchronization signal by the UE while reducing the impact on the whole PBCH coverage in a 5G system as much as possible.

Figure 3:
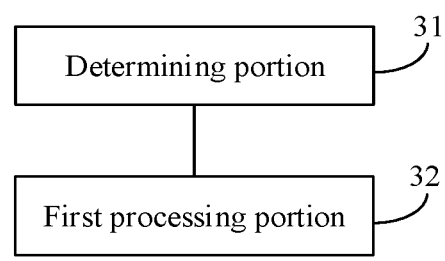
FIG. 3 is a block diagram illustrating a device for processing a PBCH bandwidth according to some embodiments of the present disclosure.

FIG. 3 is a block diagram illustrating a device for processing a PBCH bandwidth according to some embodiments of the present disclosure. The device may be located in a base station. As illustrated in FIG. 3, the device may include a determining portion 31 and a first processing portion 32.

The determining portion 31 is configured to determine whether a current frequency band is a frequency band of a preset type. The frequency band of the preset type is capable of using two types of SCSs.

In a 5G system, some frequency bands are capable of using one SCS while some other frequency bands are capable of using two SCSs. In the embodiment of the disclosure, the frequency band, which uses two SCSs, is called the frequency band of the preset type. Due to the case that the frequency band of the preset type is capable of using two SCSs, there may be a problem of an excessive time for searching for a synchronization signal by the UE.

The first processing portion 32 is configured to: if the determining portion 31 determines that the current frequency band is the frequency band of the preset type, reduce a number of bits of PBCH information included in a payload of a PBCH corresponding to the current frequency band and keep a number of REs occupied by a DMRS in a SSB corresponding to the current frequency unchanged, or, keep the number of bits of the PBCH information included in the payload of the PBCH corresponding to the current frequency band unchanged and reduce the number of the REs occupied by the DMRS in the SSB corresponding to the current frequency band.

In the embodiment of the disclosure, symbols occupied by the PBCH in the SSB occupies 288 REs, one third of which are DMRSs and the remaining two thirds of which are payloads of the PBCH. The payload includes the PBCH information and a cyclic redundancy check.

When the current frequency band is the frequency band of the preset type, the PBCH bandwidth may be reduced by reducing the number of bits of the PBCH information included in the payload of the PBCH corresponding to the current frequency band and keeping the number of the REs occupied by the DMRS in the SSB corresponding to the current frequency unchanged. For example, the PBCH information in the payload may be reduced by 14-22 bits. Preferably, the PBCH information in the payload may be reduced by 18 bits. The PBCH bandwidth may also be reduced by keeping the number of bits of the PBCH information included in the payload of the PBCH corresponding to the current frequency band unchanged and reducing the number of the REs occupied by the DMRS in the SSB corresponding to the current frequency band. For example, the DMRS in the SSB corresponding to the current frequency band may be reduced by 24-48 REs. Preferably, the DMRS in the SSB corresponding to the current frequency band may be reduced by 36 REs.

It is to be noted that the PBCH information of 12 bits is equivalent to the PBCH information of 1 PRB, and thus reducing of the number of bits of the PBCH information included in the payload of the PBCH corresponding to the current frequency band may be replaced by reducing of the number of PRBs of the PBCH information included in the payload of the PBCH corresponding to the current frequency band. Similarly, in terms of DMRS, 6 REs are equivalent to 1 PRB, and thus reducing of the number of the REs occupied by the DMRS in the SSB corresponding to the current frequency band may be replaced by reducing of the number of PRBs of the DMRS in the SSB corresponding to the current frequency and. In other words, all alternatives which are modified according to unit conversions shall be within the protection scope of the embodiment of the disclosure.

In the above embodiment of the disclosure, when the current frequency band is the frequency band of the preset type, the PBCH bandwidth can be reduced by means of reducing the number of bits of the PBCH information included in a payload of the PBCH corresponding to the current frequency band and keeping the number of the REs occupied by the DMRS in the SSB corresponding to the current frequency unchanged, or keeping the number of bits of the PBCH information included in the payload of the PBCH corresponding to the current frequency band unchanged and reducing the number of the REs occupied by the DMRS in the SSB corresponding to the current frequency band, so as to solve the problem that an excessive time is spent by UE in searching for a synchronization signal.

Figure 4:
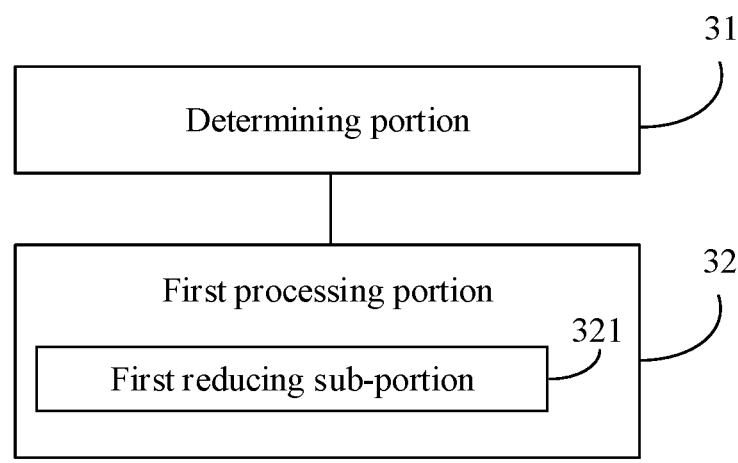
FIG. 4 is a block diagram illustrating another device for processing a PBCH bandwidth according to some embodiments of the present disclosure.

FIG. 4 is a block diagram illustrating another device for processing a PBCH bandwidth according to some embodiments of the present disclosure. As illustrated in FIG. 4, on the basis of the embodiment of the disclosure illustrated in FIG. 3, the first processing portion 32 may include a first reducing sub-portion 321.

The first reducing sub-portion 321 is configured to reduce the PBCH information in the payload by 14-22 bits.

When the current frequency band is a frequency band of the preset type, the PBCH bandwidth may be reduced by reducing a number of bits of the PBCH information included in a payload of a PBCH corresponding to the current frequency band and keeping a number of REs occupied by a DMRS in a SSB corresponding to the current frequency unchanged. For example, the PBCH information in the payload may be reduced by 14-22 bits.

As an optimized way, the first reducing sub-portion 321 may be configured to reduce the PBCH information in the payload by 18 bits.

The above embodiment of the disclosure describes an implementation mode for reducing the PBCH bandwidth by defining the reduction on the number of bits of the PBCH information.

Figure 5:
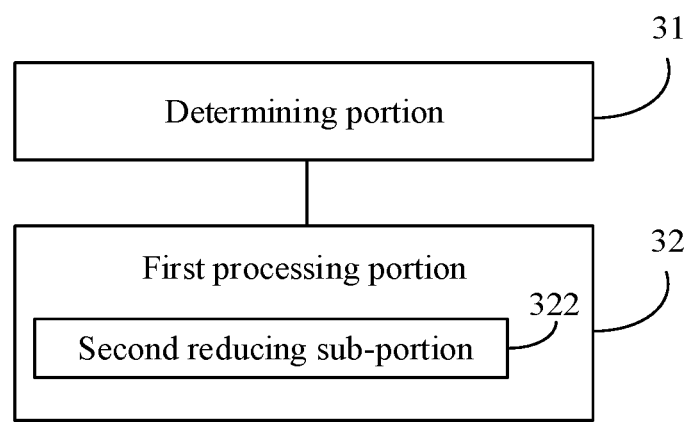
FIG. 5 is a block diagram illustrating another device for processing a PBCH bandwidth according to some embodiments of the present disclosure.

FIG. 5 is a block diagram illustrating another device for processing a PBCH bandwidth according to some embodiments of the present disclosure. As illustrated in FIG. 5, on the basis of the embodiment of the disclosure illustrated in FIG. 3, the first processing portion 32 may include a second reducing sub-portion 322.

The second reducing sub-portion 322 is configured to reduce the DMRS in the SSB corresponding to the current frequency band by 24-48 REs.

When the current frequency band is a frequency band of a preset type, the PBCH bandwidth can be reduced by keeping a number of bits of the PBCH information included in a payload of a PBCH corresponding to the current frequency band unchanged and reducing a number of the REs occupied by a DMRS in a SSB corresponding to the current frequency band. For example, the DMRS in the SSB corresponding to the current frequency band may be reduced by 24-48 REs.

As an optimized way, the second reducing sub-portion 322 may be configured to reduce the DMRS in the SSB corresponding to the current frequency band by 36 REs.

The above embodiment of the disclosure describes an implementation mode for reducing the PBCH bandwidth by defining the reduction on the number of REs of the DMRS.

Figure 6:
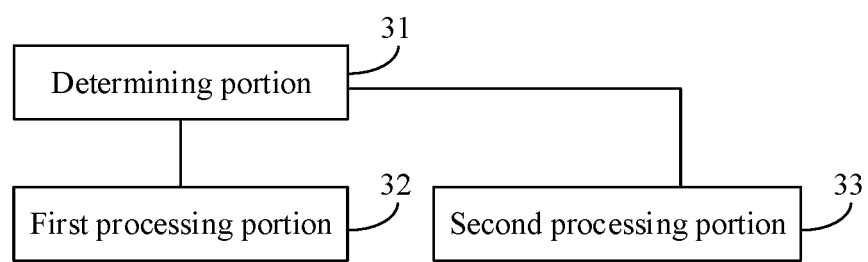
FIG. 6 is a block diagram illustrating another device for processing a PBCH bandwidth according to some embodiments of the present disclosure.

FIG. 6 is a block diagram illustrating another device for processing a PBCH bandwidth according to some embodiments of the present disclosure. As illustrated in FIG. 6, on the basis of the embodiment of the disclosure illustrated in FIG. 3, the device may also include a second processing portion 33.

The second processing portion 33 is configured to: if the determining portion 31 determines that the current frequency band is not a frequency band of the preset type, keep a bandwidth of the PBCH unchanged by reducing a number of bits of PBCH information included in a payload of a PBCH corresponding to the current frequency band and increasing a number of REs occupied by a DMRS in a SSB corresponding to the current frequency band.

When the current frequency band is not the frequency band of the preset type, there is no problem of an excessive time for searching for a synchronization signal by the UE. In the embodiment of the disclosure, in order to reduce an impact on the whole PBCH coverage in a 5G system, the number of bits of PBCH information included in the payload of the PBCH corresponding to the current frequency band can be reduced while increasing the number of REs occupied by the DMRS in the SSB corresponding to the current frequency band, so as to keep the bandwidth of the PBCH unchanged.

In the above embodiments of the disclosure, when the current frequency band is not the frequency band of the preset type, the bandwidth of the PBCH is kept unchanged by means of reducing the number of bits of PBCH information included in the payload of the PBCH corresponding to the current frequency band and increasing the number of REs occupied by the DMRS in the SSB corresponding to the current frequency band, so as to solve the problem of an excessive time for searching for a synchronization signal by the UE while reducing the impact on the whole PBCH coverage in a 5G system as much as possible.

Figure 7:
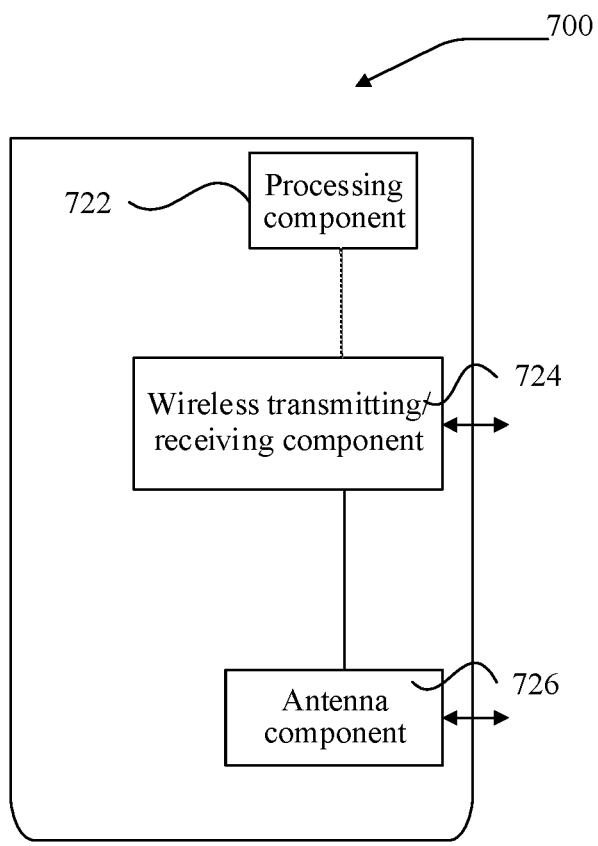
FIG. 7 is a block diagram illustrating a device suitable for processing a PBCH bandwidth according to some embodiments of the present disclosure.

FIG. 7 is a block diagram illustrating another device for processing a PBCH bandwidth according to some embodiments of the present disclosure. A device 700 may be provided as a base station. As illustrated in FIG. 7, the device 700 includes a processing component 722, a wireless transmitting/receiving component 724, an antenna component 726 and a specific signal processing part of a wireless interface. The processing component 722 may further include one or more processors.

One processor of the processing component 722 may be configured to:

determine whether a current frequency band is a frequency band of a preset type, the frequency band of the preset type being capable of using two types of SCSs; and in response to that the current frequency band is the frequency band of the preset type, reduce a number of bits of PBCH information included in a payload of a PBCH corresponding to the current frequency band and keep a number of REs occupied by a DMRS in a SSB corresponding to the current frequency unchanged, or, keep the number of bits of the PBCH information included in the payload of the PBCH corresponding to the current frequency band unchanged and reduce the number of the REs occupied by the DMRS in the SSB corresponding to the current frequency band.

In some embodiments of the present disclosure, a non-transitory computer-readable storage medium including an instruction is also provided. The above instruction may be executed by the processing component 1322 of the device 1300 to complete the above method for processing the PBCH bandwidth. For example, the non-transitory computer-readable storage medium may be a Read-Only Memory (ROM), a Compact Disc Read-Only Memory (CD-ROM), a magnetic tape, a floppy disc, an optical data storage device or the like.

Various embodiments of the present disclosure can have one or more of the following advantages.

When the current frequency band is the frequency band of the preset type, the PBCH bandwidth is reduced by means of reducing a number of bits of PBCH information included in a payload of a PBCH corresponding to the current frequency band and keeping a number of REs occupied by a DMRS in a SSB corresponding to the current frequency unchanged, or, keeping the number of bits of the PBCH information included in the payload of the PBCH corresponding to the current frequency band unchanged and reducing the number of the REs occupied by the DMRS in the SSB corresponding to the current frequency band, so as to solve the problem of an excessive time for searching for a synchronization signal by the UE.

When the current frequency band is not the frequency band of the preset type, the PBCH bandwidth is kept unchanged by means of reducing the number of bits of PBCH information included in the payload of the PBCH corresponding to the current frequency band and increasing the number of REs occupied by the DMRS in the SSB corresponding to the current frequency band, so as to solve the problem of an excessive time for searching for a synchronization signal by the UE while reducing the impact on the whole PBCH coverage in a 5G system as much as possible.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for processing a physical broadcast channel (PBCH) bandwidth, comprising:
   determining whether a present frequency band is a frequency band of a preset type, wherein the frequency band of the preset type is capable of using two types of subcarrier spacings (SCSs); and
   in response to that the present frequency band is the frequency band of the preset type, reducing the PBCH bandwidth by reducing a number of bits of PBCH information comprised in a payload of a PBCH corresponding to the present frequency band and keeping a number of resource elements (REs) occupied by a demodulation reference signal (DMRS) in a synchronization signal block (SSB) corresponding to the present frequency band unchanged, or, keeping the number of bits of the PBCH information comprised in the payload of the PBCH corresponding to the present frequency band unchanged and reducing the number of the REs occupied by the DMRS in the SSB corresponding to the present frequency band, thereby reducing an excessive time for searching for a synchronization signal by user equipment (UE); and
   in response to that the present frequency band is not the frequency band of the preset type, keeping the PBCH bandwidth unchanged by reducing the number of bits of PBCH information included in the payload of the PBCH corresponding to the present frequency band and increasing the number of REs occupied by the DMRS in the SSB corresponding to the present frequency band, thereby reducing an excessive time for searching for a synchronization signal by the UE while reducing impact on PBCH coverage in the 5G communication system.

2. The method according to claim 1, wherein the reducing the number of bits of PBCH information comprised in the payload of the PBCH corresponding to the present frequency band comprises:
   reducing the number of bits of the PBCH information in the payload by 14-22 bits.

3. The method according to claim 2, wherein the reducing the PBCH information in the payload by 14-22 bits comprises:
   reducing the number of bits of the PBCH information in the payload by 18 bits.

4. The method according to claim 1, wherein reducing the number of the REs occupied by the DMRS in the SSB corresponding to the present frequency band comprises:
   reducing the number of the REs occupied by the DMRS in the SSB corresponding to the present frequency band by 24-48 REs.

5. The method according to claim 4, wherein the reducing the DMRS in the SSB corresponding to the present frequency band by 24-48 REs comprises:
   reducing the number of the REs occupied by the DMRS in the SSB corresponding to the present frequency band by 36 REs.

6. The method according to claim 1, wherein the reducing of the number of bits of PBCH information comprised in the payload of the PBCH corresponding to the present frequency band is replaced by reducing of a number of physical resource blocks (PRBs) of the PBCH information included in the payload of the PBCH; and
   reducing of the number of the REs occupied by the DMRS in the SSB corresponding to the present frequency band is replaced by reducing of a number of PRBs of the DMRS in the SSB.

7. A device for processing a physical broadcast channel (PBCH) bandwidth, comprising:
   a processor;
   memory storing instructions for execution by the processor:
   determine whether a present frequency band is a frequency band of a preset type, wherein the frequency band of the preset type is capable of using two types of subcarrier spacings (SCSs); and
   in response to that that the present frequency band is the frequency band of the preset type, reduce the PBCH bandwidth by reducing a number of bits of PBCH information comprised in a payload of a PBCH corresponding to the present frequency band and keeping a number of resource elements (REs) occupied by a demodulation reference signal (DMRS) in a synchronization signal block (SSB) corresponding to the present frequency band unchanged, or, keeping the number of bits of the PBCH information comprised in the payload of the PBCH corresponding to the present frequency band unchanged and reducing the number of the REs occupied by the DMRS in the SSB corresponding to the present frequency band, thereby reducing an excessive time for searching for a synchronization signal by user equipment (UE); and
   in response to that the present frequency band is not the frequency band of the preset type, keep the PBCH bandwidth unchanged by reducing the number of bits of PBCH information included in the payload of the PBCH corresponding to the present frequency band and increasing the number of REs occupied by the DMRS in the SSB corresponding to the present frequency band, thereby reducing an excessive time for searching for a synchronization signal by the UE while reducing impact on PBCH coverage in the 5G communication system.

8. The device according to claim 7, wherein the processor is further configured to:
reduce the number of bits of the PBCH information in the payload by 14-22 bits.

9. The device according to claim 8, wherein the processor is configured to:
reduce the number of bits of the PBCH information in the payload by 18 bits.

10. The device according to claim 7, wherein the processor is configured to:
reduce the number of the REs occupied by the DMRS in the SSB corresponding to the present frequency band by 24-48 REs.

11. The device according to claim 10, wherein the processor is further configured to:
reduce the number of the REs occupied by the DMRS in the SSB corresponding to the present frequency band by 36 REs.

12. The device according to claim 7, wherein the reducing of the number of bits of PBCH information comprised in the payload of the PBCH corresponding to the present frequency band is replaced by reducing of a number of physical resource blocks (PRBs) of the PBCH information included in the payload of the PBCH; and
reducing of the number of the REs occupied by the DMRS in the SSB corresponding to the present frequency band is replaced by reducing of a number of PRBs of the DMRS in the SSB.

13. A non-transitory computer readable storage medium having stored thereon computer instructions that, when executed by a processor, cause the processor to implement operations of a method for processing a physical broadcast channel (PBCH) bandwidth, the method comprising:
determining whether a present frequency band is a frequency band of a preset type, wherein the frequency band of the preset type is capable of using two types of subcarrier spacings (SCSs); and
in response to that the present frequency band is the frequency band of the preset type, reducing the PBCH bandwidth by reducing a number of bits of PBCH information comprised in a payload of a PBCH corresponding to the present frequency band and keeping a number of resource elements (REs) occupied by a demodulation reference signal (DMRS) in a synchronization signal block (SSB) corresponding to the present frequency band unchanged, or, keeping the number of bits of the PBCH information comprised in the payload of the PBCH corresponding to the present frequency band unchanged and reducing the number of the REs occupied by the DMRS in the SSB corresponding to the present frequency band, thereby reducing an excessive time for searching for a synchronization signal by user equipment (UE); and
in response to that the present frequency band is not the frequency band of the preset type, keeping the PBCH bandwidth unchanged by reducing the number of bits of PBCH information included in the payload of the PBCH corresponding to the present frequency band and increasing the number of REs occupied by the DMRS in the SSB corresponding to the present frequency band, thereby reducing an excessive time for searching for a synchronization signal by the UE while reducing impact on PBCH coverage in the 5G communication system.

14. The non-transitory computer readable storage medium according to claim 13, wherein reducing the number of bits of PBCH information comprised in the payload of the PBCH corresponding to the present frequency band comprises:
reducing the number of bits of the PBCH information in the payload by 14-22 bits.

15. The non-transitory computer readable storage medium according to claim 14, wherein reducing the PBCH information in the payload by 14-22 bits comprises:
reducing the number of bits of the PBCH information in the payload by 18 bits.

16. The non-transitory computer readable storage medium according to claim 13, wherein the reducing the number of the REs occupied by the DMRS in the SSB corresponding to the present frequency band comprises:
reducing the number of the REs occupied by the DMRS in the SSB corresponding to the present frequency band by 36 REs.

17. A 5G communication system, comprising a base station, wherein the base station is configured to:
in a case that a current frequency band is a frequency band of a preset type, reduce a physical broadcast channel (PBCH) bandwidth by reducing a number of bits of PBCH information included in a payload of a PBCH corresponding to the current frequency band and keeping a number of resource elements (REs) occupied by a demodulation reference signal (DMRS) in a synchronization signal block (SSB) corresponding to the current frequency band unchanged, or, keeping the number of bits of the PBCH information included in the payload of the PBCH corresponding to the current frequency band unchanged and reducing the number of the REs occupied by the DMRS in the SSB corresponding to the current frequency band, thereby reducing an excessive time for searching for a synchronization signal by user equipment (UE); and
in a case that the current frequency band is not the frequency band of the preset type, keep the PBCH bandwidth unchanged by reducing the number of bits of PBCH information included in the payload of the PBCH corresponding to the current frequency band and increasing the number of REs occupied by the DMRS in the SSB corresponding to the current frequency band, thereby reducing an excessive time for searching for a synchronization signal by the UE while reducing impact on PBCH coverage in the 5G communication system.

* * * * *